(12) United States Patent
Nagel

(10) Patent No.: US 7,509,214 B2
(45) Date of Patent: Mar. 24, 2009

(54) VEHICLE NAVIGATION WITH INTEGRATED CURVE WARNING

(75) Inventor: Philipp Harald Nagel, Seevetal (DE)

(73) Assignee: Harman Becker Automotive System GmbH, Karlsbad (DE)

( * ) Notice: Subject to any disclaimer, the term of this patent is extended or adjusted under 35 U.S.C. 154(b) by 397 days.

(21) Appl. No.: 11/283,341

(22) Filed: Nov. 18, 2005

(65) Prior Publication Data

US 2006/0287817 A1 Dec. 21, 2006

(30) Foreign Application Priority Data

Nov. 19, 2004 (EP) .................................. 04027568

(51) Int. Cl.
*G01C 21/00* (2006.01)
(52) U.S. Cl. ....................... 701/209; 701/207
(58) Field of Classification Search ................ 701/200, 701/207–209, 213–215; 340/988, 995.1; 342/70

See application file for complete search history.

(56) References Cited

U.S. PATENT DOCUMENTS

| | | | |
|---|---|---|---|
| 6,141,617 A | | 10/2000 | Matsuda et al. |
| 6,161,071 A | * | 12/2000 | Shuman et al. ............... 701/48 |
| 2005/0225477 A1 | * | 10/2005 | Cong et al. ................... 342/70 |

FOREIGN PATENT DOCUMENTS

| | | |
|---|---|---|
| DE | 42 01 142 A1 | 8/1992 |
| DE | 102 44 329 A1 | 4/2004 |
| EP | 0543543 A | 11/1992 |

* cited by examiner

*Primary Examiner*—Yonel Beaulieu
(74) *Attorney, Agent, or Firm*—Brinks Hofer Gilson & Lione

(57) ABSTRACT

A navigation system evaluates vehicle and environmental parameters to determine if a vehicle can pass through a curved path. The system determines a vehicle position and a vehicle velocity. The system processes position and velocity information to determine if the vehicle can pass through the curved path. If a curved path cannot be traversed, the system issues a warning.

32 Claims, 7 Drawing Sheets

VEHICLE NAVIGATION WITH INTEGRATED CURVE WARNING

BACKGROUND OF THE INVENTION

1. Priority Claim

This application claims the benefit of priority from European Patent Application No. 04027568.7, filed Nov. 19, 2004, which is incorporated by reference.

2. Technical Field

The invention relates to a vehicle safety system, and more particularly, to a system that analyzes vehicle and environmental parameters.

3. Related Art

Navigation systems determine the position and velocity of a vehicle. Electronic maps may be used with navigation systems to represent environmental features, such as streets, buildings, and/or rivers.

In some navigation systems, the environmental features are represented by straight lines. Since streets or roads may have curves, some navigation maps do not accurately display these features. As a result, some navigation systems do not provide a driver with reliable warnings. Therefore, a need exits for an improved vehicle safety system.

SUMMARY

A navigation system evaluates vehicle and environmental parameters to determine if a vehicle can pass through a curved path. The system determines a vehicle position and a vehicle velocity. The system may process this information, along with models of the curved path, to determine if the vehicle can pass through the curved path. A warning is sent by the system if a vehicle may not pass through the curved path.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
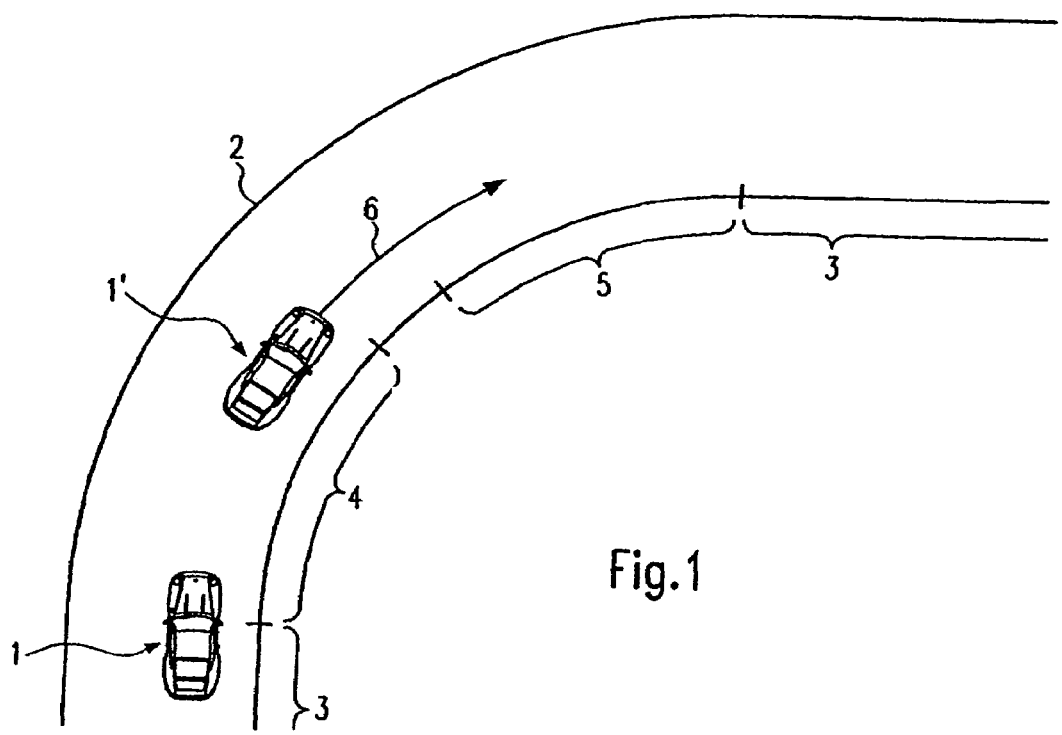
FIG. 1 is a diagram of a vehicle approaching and passing through a curve.

A navigation system may interface to or be integrated with warning logic. If the current velocity of a vehicle, such as a structure for transporting persons and/or things, is too high to ensure safe passage through a curve, the warning logic may issue a warning. In FIG. 1, a vehicle 1 approaches a curve 2. If the curve may be represented by a clothoid model, the straight sections of the road 3 are matched to clothoid curves 4 and 5.

A "clothoid model" may represent the parameters of a curve and the unique functional dependence of the parameters of a curve through clothoids (e.g., the arc length, the radius, the tangent angle, the clothoid parameter, and the curvature). Clothoids are geometric curves that may represent a subclass of cycloids. Clothoids may be characterized by a curvature that is proportional to an arc length L: $C=L/A^2$ (where A is the clothoid parameter that uniquely characterizes individual clothoid curves of arbitrary radius). A continuous transition from straight lines without curvature to circles with a finite curvature $C=1/R$ (where R denotes the radius of curvature) may be represented by clothoids.

In FIG. 1, a vehicle 1' is positioned at some position $L_o$ within a curve. The vehicle is subject to a centrifugal acceleration that is proportional to the curvature of a portion of the path. If the curvature at $L_o$ is known, and the velocity is almost constant, the curvature and centrifugal acceleration at some neighbored point l along the forward path 6 of the vehicle may be calculated by a Taylor expansion $$C(L_o + l) = C_o + l\left(\frac{dC}{dL}\right)_{L=L_o} = C_o + \frac{l}{A^2}$$

where C is proportional to the arc length L. For a constant velocity of the vehicle the centrifugal acceleration is proportional to curvature and thereby the arc length.

Figure 2:
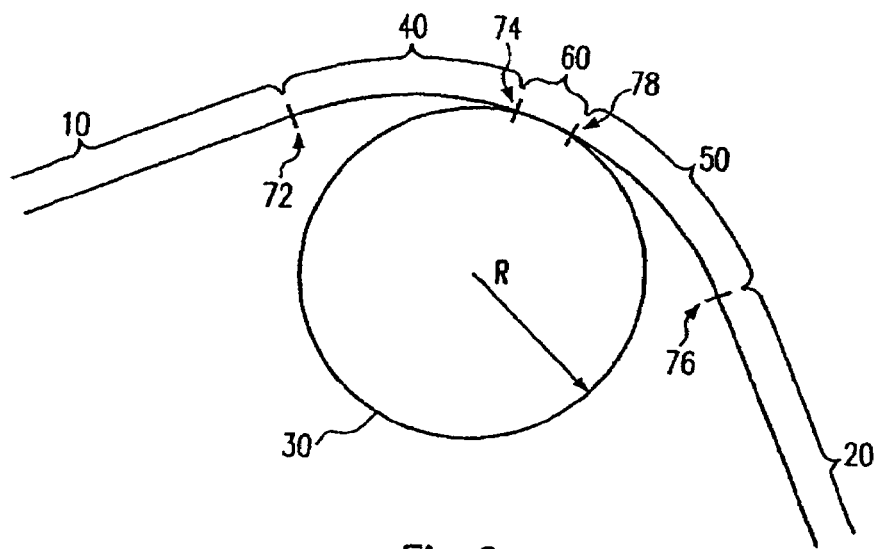
FIG. 2 is a diagram of a continuous matching of lines to a circle.

FIG. 2 illustrates the transition from straight lines 10 and 20 to a circle 30 by clothoids 40 and 50. The straight line 10 may be continuously matched with a segment of the circle 30 with radius R, such as segment 60. As shown, the straight line 10 matches a clothoid 40 at some starting point 72 of the clothoid 40, characterized by C=0. At the final point 74 of the clothoid 40, the curvature is $C=1/R$, where R is the radius of circle 30. Point 74 represents the transition point from the clothoid 40 to the circle 30 or the segment 60 of the circle 30. A straight line 20 at the opposite side of the circle may also be matched with the segment 60 of the circle 30 through the use of a second clothoid 50. The respective transition points between the straight line 20 and the clothoid 50 and between the clothoid 50 and the segment 60 of the circle 30 are denoted by 76 and 78, respectively. The result of the matching procedures represents a continuous approximately 90° curve that can be smoothly passed without any necessity of abrupt steering and/or braking.

In Cartesian coordinates the parameter representation of clothoids may be derived from $x=\int \cos t\, dL$ and $y=\int \sin t\, dL$ with the tangent angle $t=L^2/2A^2$. Solutions to these integrals, which may comprise Fresnel Integrals, are obtained by numerical integration or, by expansion of the trigonometric functions in power series $$x = L - \frac{L^5}{40A^4} + \frac{L^9}{3456A^8} - \frac{L^{13}}{599040A^{12}} \pm \ldots$$

and $$y = \frac{L^3}{6A^2} - \frac{L^7}{336A^6} - \frac{L^{11}}{42240A^{10}} \mp \ldots$$

As shown in FIG. 1 and 2, only small fractions of clothoids far away from their asymptotic points $X_{L\to\infty}=Y_{L\to\infty}\sim A$ with R=0 may be considered.

Many clothoids are similar to each other. The clothoid with A=1 is called the unity clothoid. If the parameters relevant for the construction of a unity clothoid are know, these parameters, e.g., R, L, C, and t, may be calculated for an arbitrary clothoid by simple multiplication with A. This leads to the compilation of tables of the parameters used in clothoid modeling. X- and Y-coordinates may also be directly calculated through the power series.

Based on geometric properties of clothoids, geometric curves may be used to represent real curves in digital maps. A safety system comprising or interfaced to warning logic may use curve parameters, such as a measured or approximated curvature, to determine whether to issue a warning that a vehicle may not pass through a curved path.

Figure 3:
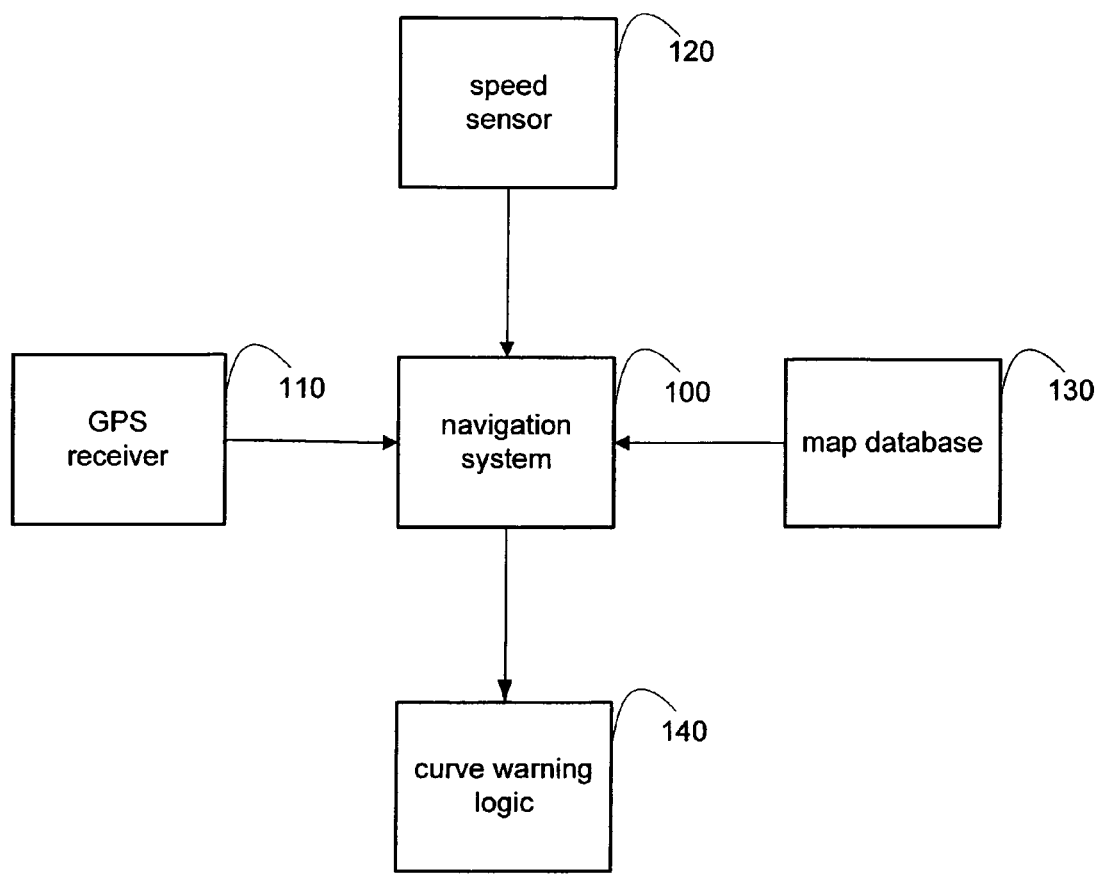
FIG. 3 is a system that issues curve warnings.

FIG. 3 is a block diagram of a navigation system 100 interfaced to various devices. Interfacing devices may include a location detection device 110, such as a global positioning satellite (GPS) receiver; a speed sensor 120; a geographical storage device 130, such as a map database; and warning logic, such a curve warning logic 140. Navigation system 100 may be used with a vehicle, and may comprise a processor, such as a central processing unit (CPU) interfaced to a receiver, a transmitter, and a memory.

The processor of the navigation system 100 may be configured to determine the curve parameters, such as the curvature of an approaching path. The determination of the curve parameters may be based on a clothoid model of an approached curve and may be determined using a subset of relevant curve parameters comprising the clothoid parameter A. The processor may determine the curve parameters at or near the same rate of time perceived by a user (e.g., in real-time) or in delayed time (e.g., batch). Once the curve parameters have been determined, the processor may transmit the parameters in real or delayed time to curve warning logic 140.

The receiver of navigation system 100 may receive state parameters from various sensors, such as a GPS receiver 110, and/or a velocity sensor 120. State parameters may comprise measured and/or detected driving and/or ambient factors. Measured and/or detected driving and/or ambient factors may be derived or estimated and may be time-dependent. The measured and/or detected driving and/or ambient factors may model the forward path of a vehicle. State parameters may comprise a raw measurement and/or detection and/or estimation of driving and/or ambient factors. Alternatively, state parameters may be modeled through mathematical functions on some or all of the measured and/or detected data. State parameters may comprise the acceleration of a vehicle, a current velocity, an estimated future velocity, and/or the current centrifugal acceleration. The state parameters may be based on various measured and/or detected and/or estimated data, such as an estimated future centrifugal acceleration, weather parameters, a turn about a vertical axis, friction coefficients, road adherence factors, wind speed, other data received by the curve warning logic 140, and/or combinations of these parameters.

A receiver of navigation system 100 may additionally receive data that has been transferred from map database 130 at the request of the processor (e.g., downloaded). The downloaded data may comprise clothoid parameters of a curve in the forward path of the vehicle and/or along the route to the destination chosen by the driver. The processor of navigation system 100 may process these clothoid parameters to obtain a clothoid model. The clothoid model may be modeled by one clothoid or by a plurality of clothoids merged together. The clothoid model and/or the received data may be processed by the processor of navigation system 100 to determine the current position of the vehicle. Additionally, navigation system 100 may interface to or be integrated with curve warning logic 140, and may transmit monitored and/or measured data to curve warning logic 140. In some systems, some or all of the curve parameters may be stored in map database 130. In these systems, the processing time may be shortened since the processor may not process clothoid parameters.

Map database 130 may comprise digital maps having digital representations of curves and respective clothoid parameters. The curves may be modeled by a clothoid. For paths that may be represented by clothoid models, numerical modeling and digital representation of these paths by clothoids results in substantially reliable and accurate information about curve parameters. These curve parameters may include the curvature of a path to be passed by a vehicle, and/or the arc length, radius, tangent angle, or Cartesian coordinates of the curve. Data within the map database may be sent to a display device.

The velocity sensor 120 may comprise motion sensors, such as Anti-Lock Braking System (ABS) wheel sensors. These sensors may be positioned in proximity to each individual wheel or within a differential. Curve warning logic 140 may comprise a receiver, a controller, and a transmitter. Curve warning logic 140 receives data from navigation system 100. This data may comprise a state parameter, such as a vehicle's current velocity, or a plurality of state parameters. The controller of curve warning logic 140 may compare the received data with other measured and/or modeled conditions such as the critical velocity that may not be exceeded to ensure passage of a curve in a vehicle's forward path or a curve that is being traversed by the vehicle. The critical velocity may be derived from one or more received state parameters and/or measured and/or detected data received by curve warning logic 140 and/or estimated by curve warning logic 140. If the critical velocity is exceeded, curve warning logic 140 provides a warning. The warning may be acoustic, and/or optical, and/or based on the sense of touch (e.g., haptic), such as a vibration that is noticeable to the driver. The critical velocity may be calculated with reference to a critical limit for the centrifugal acceleration. To safely pass a curve, the centrifugal acceleration, $a_c = C \cdot v^2$ (where v denotes the velocity of the vehicle), must be compensated. Alternatively, the curve warning logic 140 may be configured to send a warning, if a predetermined parameter below a critical parameter is exceeded (e.g., if a predetermined velocity value below the critical velocity is exceeded). In some systems, a driver may choose some percentage of the critical parameter, such as velocity, as the predetermined parameter. Because the critical parameter is derived from one or more state parameters, a predetermined parameter may also be based on measured and/or detected and/or estimated data used to derive the state parameters.

The centrifugal force applied to a vehicle passing through a curve may be compensated by a frictional force represented by a frictional coefficient. The frictional coefficient may be stored in the map database 130.

In some systems, map database 130 may include physically and/or logically separated databases. A first database may include the curves in a digital map and a second database may include clothoid models for the curves of the first database. The curves may be mapped to the parameter sets that comprise the clothoid models by references included with map database 130. Moreover, some systems may include additional vehicle and/or environmental sensors, such as a gyroscope which may be a piezo sensor detecting crystal vibrating in one plane to measure rotation of the vehicle around an axis that is substantially perpendicular to the road, or weather sensors such as a hygrometer or an anemometer.

Figure 4:
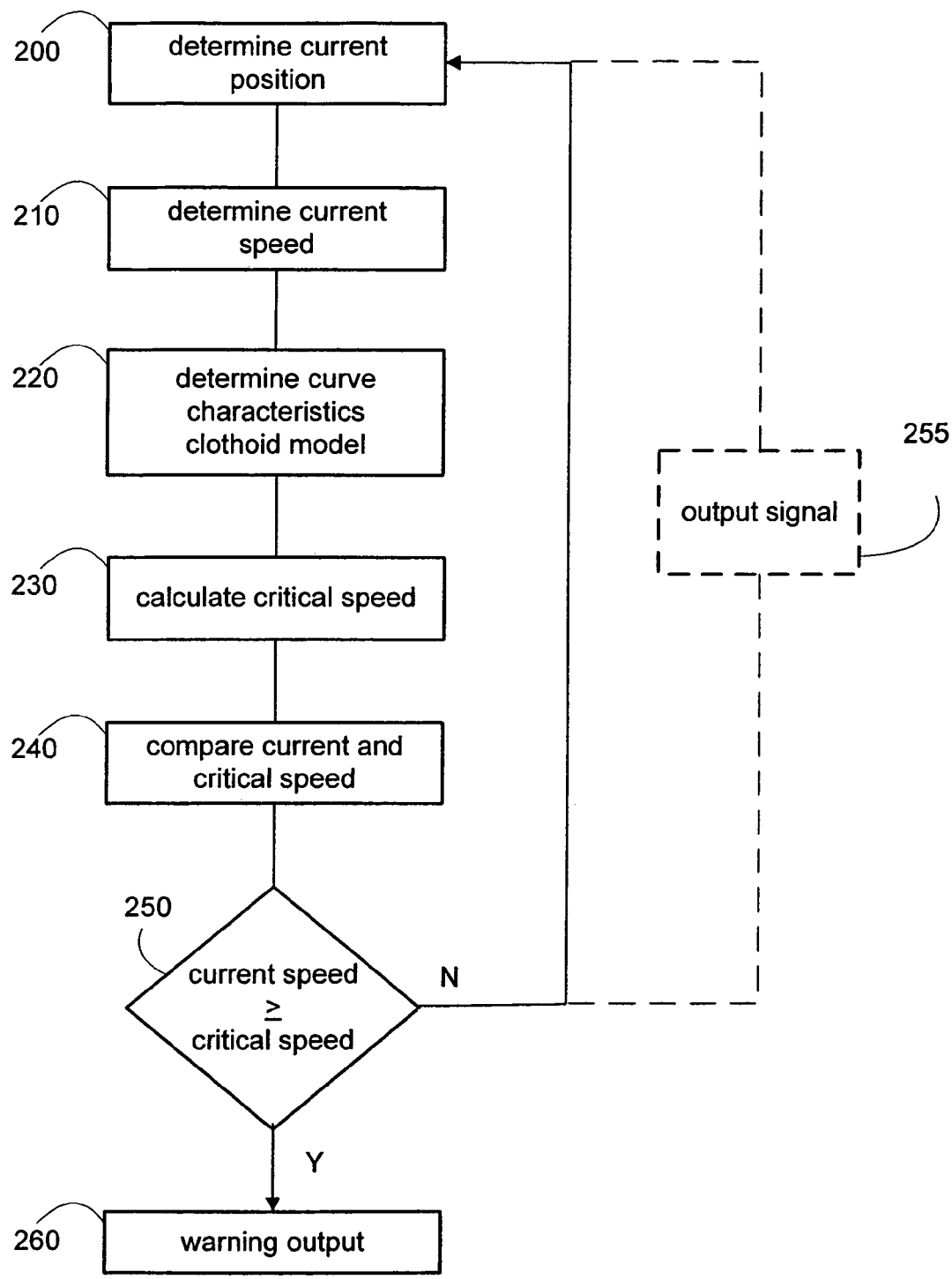
FIG. 4 is a flowchart of a system that issues curve warnings.

FIG. 4 is a flowchart of a navigation system interfaced to curve warning logic. At act 200, the current position of a vehicle is determined by the navigation system. At act 210, the current velocity of the vehicle is determined. The data obtained at acts 200 and 210 may be derived through a combination of motion data provided by motion sensors and map matching.

At act 220, the parameters of a curve approached by the vehicle are determined. These parameters may be determined through a clothoid model. The critical velocity may be calculated at act 230 based on the clothoid representation of the curve. The critical velocity represents the highest speed or nearly the highest speed that ensures passage along the entire curve. If desired, curve warning logic may send a warning when a predetermined velocity is exceeded. In some methods, the predetermined velocity may be less than the critical velocity.

The vehicle's current velocity and the critical velocity are compared at act 240. At act 250, a determination as to whether the current velocity exceeds the critical velocity is made. If the current velocity exceeds the critical velocity, curve warning logic issues a warning at act 260. If the current velocity does not exceed the critical velocity, curve warning logic may return to act 200 or, prior to returning to act 200, may send a signal indicating passage of the curve may be expected at act 255. An output signal (acts 255 and/or 260) may be acoustic, and/or optical, and/or a haptic signal. The acts of the flowchart in FIG. 4 may be applied to a vehicle that is approaching a curve or to a vehicle that is passing through a curve.

Figure 5:
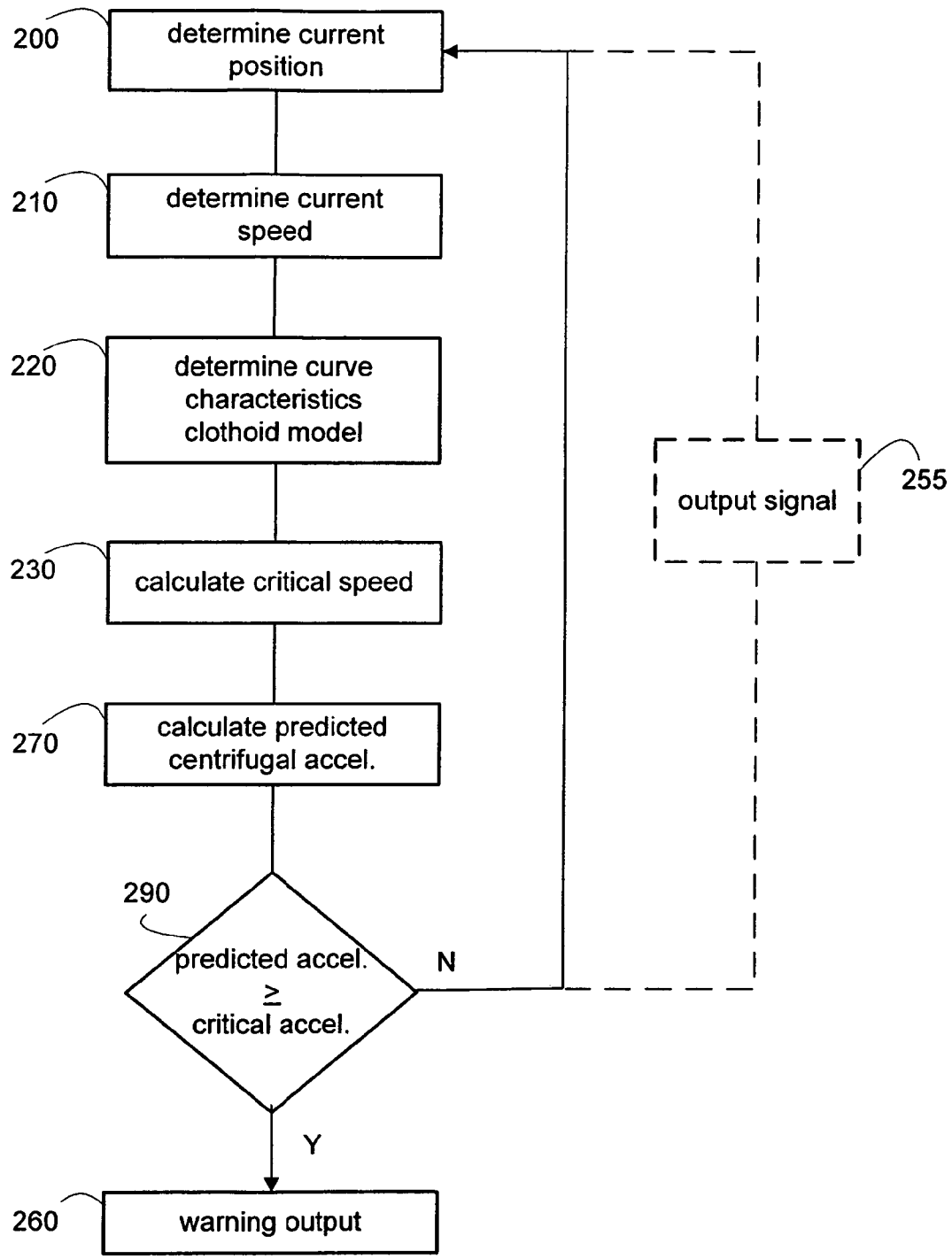
FIG. 5 is an alternate flowchart of a system that issues curve warnings.

FIG. 5 is an alternate flowchart of a navigation system interfaced to curve warning logic. The current position and the current velocity of a vehicle are determined at acts 200 and 210, respectively. The parameters of a curve approached by the vehicle or of a curve that is being passed through by the vehicle are determined at act 220. These parameters may be determined according to a clothoid model. At act 230, the vehicle's critical velocity is determined.

When a method assumes that the vehicle's velocity will be kept almost constant when the vehicle passes through a curve, a substantially continuous predicted centrifugal acceleration of the vehicle through the entire path of the curve is determined at act 270. This method may utilize the clothoid models. In these models, at a constant velocity, the centrifugal force ac is proportional to the arc length of the curve, e.g., approximately the path length of the vehicle passing the curve. The constant of proportionality may comprise the inverse square of the clothoid parameter A. The information about the centrifugal acceleration permits the determination of the associated centrifugal force that is compensated for a vehicle to pass through a curve.

The predicted centrifugal acceleration is compared to the critical centrifugal acceleration at act 280. The critical centrifugal acceleration may be measured and/or estimated using sensors or derived from other data, such as the critical velocity, determined at act 230. The critical centrifugal acceleration is the upper centrifugal acceleration limit that ensures passage along the curve.

If the predicted centrifugal acceleration exceeds the critical centrifugal acceleration at act 290, curve warning logic issues a warning at act 260. If the predicted centrifugal acceleration does not exceed the critical centrifugal acceleration, curve warning logic may return to act 200 to restart the process or, prior to returning to act 200, may output a signal indicating passage of the curve may be expected, at act 255. An output signal (acts 255 and/or 260) may be acoustic, and/or optical, and/or a haptic signal.

Figure 6:
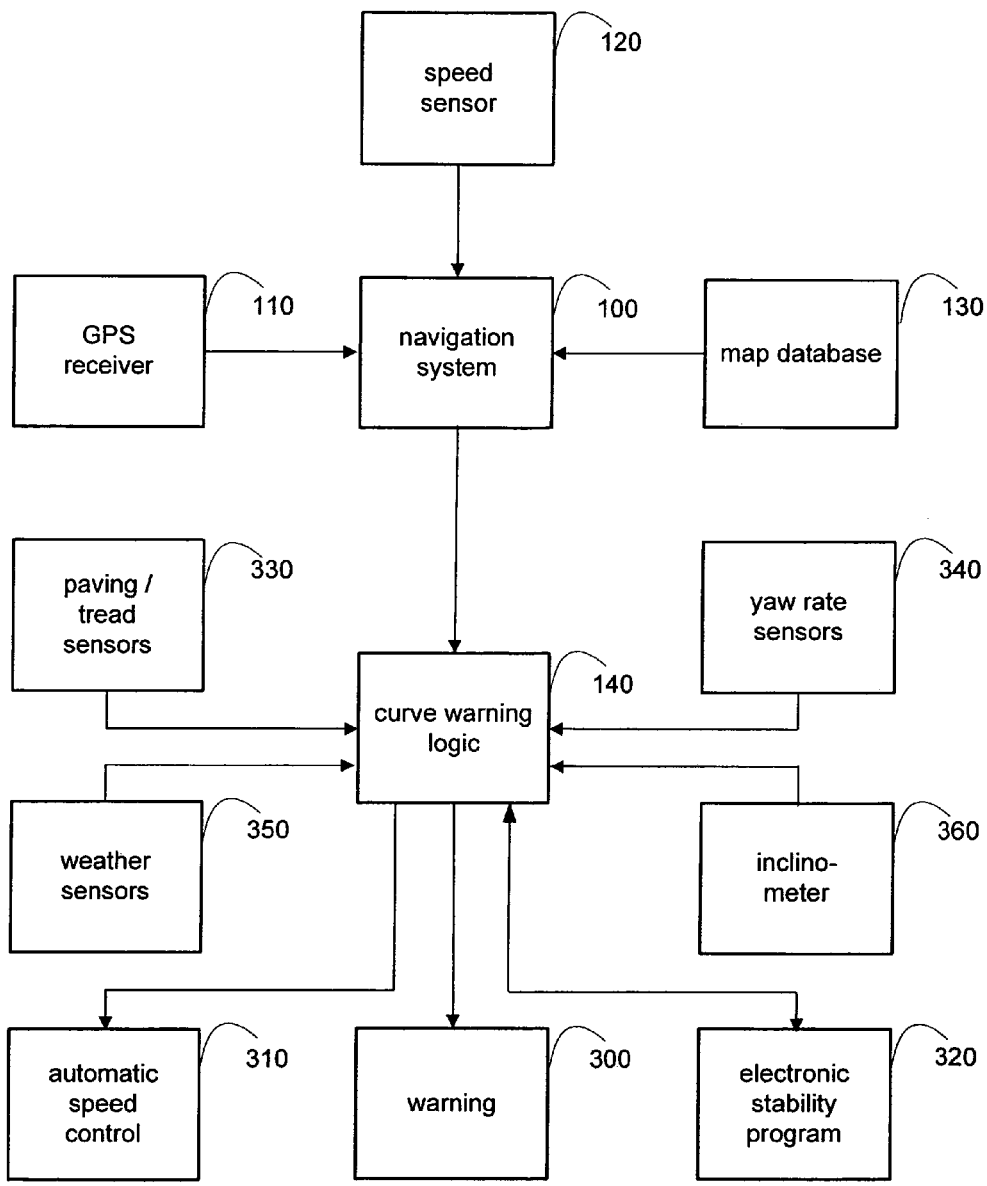
FIG. 6 is an alternate system that issues curve warnings.

FIG. 6 is an alternative navigation system 100 interfaced to various devices, including curve warning logic 140. When the curve warning logic 140 detects that a current velocity or predicted centrifugal acceleration exceeds the respective critical values, a warning 300 is issued by curve warning logic 140.

The warning may comprise acoustic, and/or optical, and/or a haptic signal. Acoustic warnings may include beeping or buzzer like sounds. Additionally, and/or alternatively, an acoustic warning may comprise a synthesized voice or verbal warnings, such as "Reduce velocity!" Optical warnings may comprise blinking lights within a driver's line of sight, or animations, such as animations displayed on a navigation system's display. Haptic warnings may comprise noticeable vibrations sent to a driver while operating the vehicle. The acoustic, and/or optical, and/or haptic warnings may vary in intensity (e.g., volume, tone, brightness, repetition pattern, and/or strength) based on the difference between the current velocity and the critical velocity and/or the predicted centrifugal acceleration and the critical centrifugal acceleration.

In addition to issuing warnings, curve warning logic 140, may control or interface additional vehicle safety features. In FIG. 6, these features may improve the safety of the vehicle's passengers. These additional safety features may include automatic speed control 310 and/or electronic stability program 320.

If the critical velocity and/or critical centrifugal acceleration (or a predetermined velocity and/or predetermined centrifugal acceleration) are exceeded or projected to be exceeded, the navigation system may control the engine and/or brake of the vehicle. This control may be executed through an automatic speed control 310. Automatic speed control 310 may be configured with a delay to permit a driver to take corrective action upon receipt of a warning from curve warning logic 140. If the driver fails to react to the warnings, some navigation systems 100 may engage the automatic speed control 310 to reduce or eliminate the risk of not passing a curve. Since such interference may be intrusive, a manual or voiced controlled switch may also be included to disengage this feature. However, for new drivers and in bad weather conditions and/or during night time driving, such automatic speed control may prove helpful. In some systems, curve warning logic 140 may interface to an ABS controller to control the speed of a vehicle.

The electronic stability program 320 may detect and/or model stability parameters. These stability parameters may include steering angle and/or engine speed. Additionally, electronic stability program may communicate through a bi-directional bus with curve warning logic 140. Electronic stability program 320 may transmit stability parameters to curve warning logic 140, which may be used to determine whether to issue a warning. Additionally, electronic stability program 320 may receive data sampled and evaluated by curve warning logic 140. The combination of the curve warning logic 140 and electronic stability program 320 may substantially reduce the risk of skidding in curves.

Some curve warning logic 140 may access additional data sources, such as data provided by sensors. In FIG. 6, additional sensors may comprise sensors that measure and/or estimate: a frictional coefficient and/or tread measurement, such as paving and tread sensors 330; the transversal movement of a vehicle, such as yaw rate sensors 340 (e.g., a turn about a vertical axis); environmental ambient parameters, such as weather sensors 350; and/or the inclination of a vehicle with respect to a horizontal axis, such as an inclinometer 360.

Paving and tread sensors 330 may estimate a frictional coefficient and/or a tread measurement. The frictional coefficient may be used to determine the frictional forces that influence the balance of the mechanical forces. The frictional coefficient may vary depending on the contact surface. For example, an asphalt surface exhibits a different frictional coefficient than a cobblestone pavement. A tread measurement may be used to determine road adherence which may vary depending on various conditions. For example, a wet road will have a different adhesion than a dry road. Curve warning logic 140 may receive and process measured and/or modeled data from paving and tread sensors 330 to take into account the slip of the road and/or road adherence when determining whether a predetermined or critical parameter is exceed or may be exceed in the future.

Yaw rate sensors 340 may be used to measure the transversal movement of a vehicle. Yaw rate sensors 340 may comprise a gyroscopic sensor. A gyroscopic sensor may measure and/or model the angular velocity of a vehicle. Alternatively, the yaw rate may be determined by detecting the rotation velocity by oscillating a tuning fork for excitation and sensing the vibrations produced by the rotary motion using a tuning fork for detection. A rather high sensitivity can be achieved by employing the crystal piezoelectric effect. In determining the current velocity as well as the yaw rate, a set of mathematical equations that provide an efficient computational (recursive) means to estimate the state of a process, in a way that minimizes the mean of the squared error, such as Kalman filters, may be used.

Weather sensors 350 may measure and/or model environmental ambient parameters. Weather sensors 350 may comprise a hygrometer, for measuring humidity, and/or anemometers, for measuring the force or speed of wind. Humidity may influence the frictional coefficient and therefore may affect whether a warning needs to be issued by curve warning logic 140. Similarly, cross winds measured by an anemometer may affect the determination of whether a warning condition exists.

Figure 7:
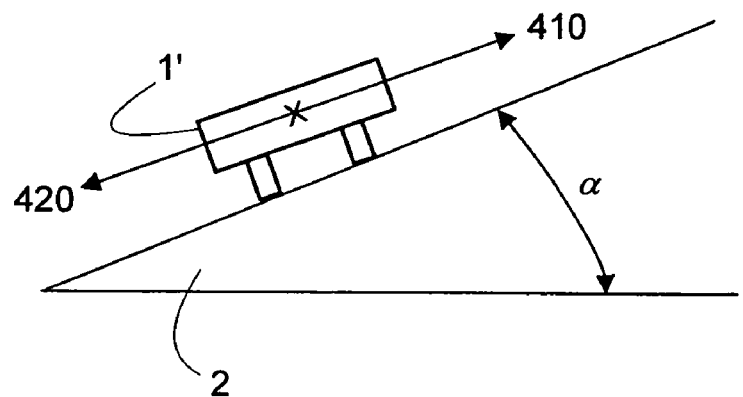
FIG. 7 is a force diagram for a vehicle passing through a curve.

Inclinometer 360 may measure and/or model the cross slope of a road. Similar to the other data source sensors, the measured and/or modeled data may be used by curve warning logic 140 in balancing the mechanical forces acting on a vehicle as it passes along a curved path. FIG. 7 illustrates the impact of a finite slope measured by the inclination angle α on the balance of the mechanical forces 410 and 420 acting on vehicle 1' that passes a curve 2. The centrifugal force is given by $m \cdot C \cdot v^2$ (where m denotes the mass of the vehicle) and has a component 410 parallel to the road of $m \cdot C \cdot v^2 \cdot \cos(\alpha)$. The gravitational force has a component 420 that counteracts the centrifugal force. The gravitational component is $m \cdot g \cdot \sin(\alpha)$ (where g is the gravitational acceleration). The utilization of an inclinometer is helpful in estimating the balance of forces.

Figure 8:
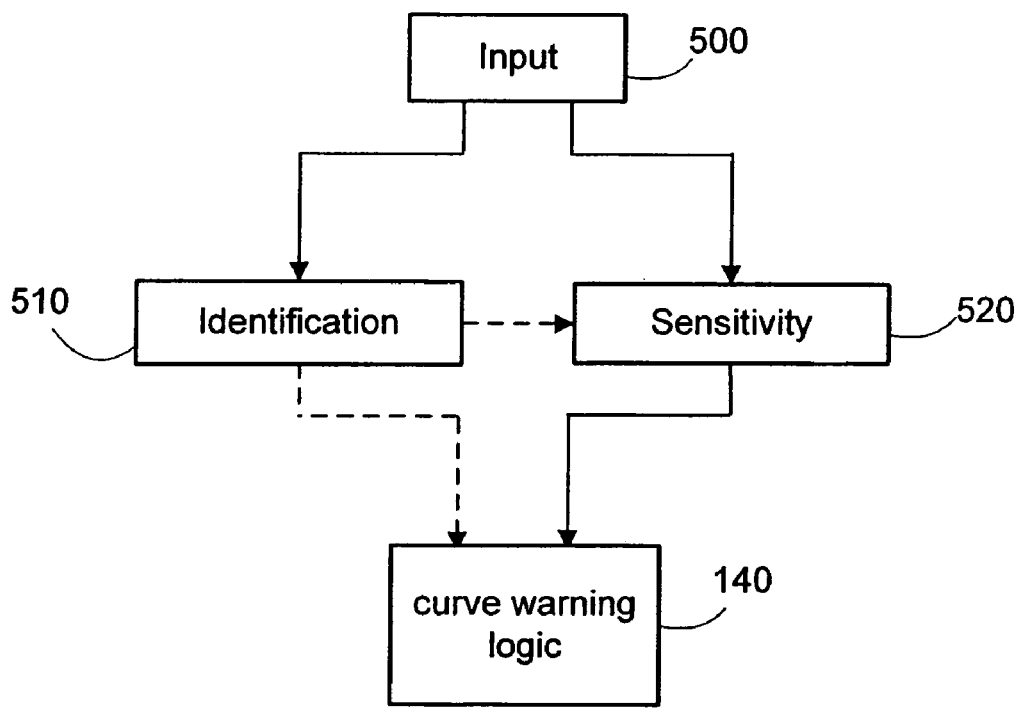
FIG. 8 is a partial flowchart of a system that issues curve warnings.

FIG. 8 is a block diagram of additional inputs to curve warning logic 140. A driver may use input device 500 associated with a navigation system, such as a keypad, pushbutton, and/or an acoustic input device (e.g., microphone) to create, modify, and/or recall an identification profile 510. Identification profile 510 may include a user's predetermined limit parameters (e.g., predetermined values below the critical values that if exceeded result in a warning from curve warning logic 140). Curve warning logic 140 may include an intelligent data processing device, such as a neural network, to adapt to a driver's driving qualities and/or preferences. To adapt to a driver's driving qualities and/or preferences, curve warning logic 140 may receive as an input identification profile 510. Alternatively, a driver 5 may use input device 500 to select a desired sensitivity setting 520 of curve warning logic 140. For example, a driver may choose from a High/Medium/Low alternative to cause the curve warning logic to prompt a warning according to predetermined limit parameter values consisting of different ratios of the current velocity and the critical velocity and/or the predicted centrifugal acceleration and/or the critical centrifugal acceleration. Driver 10 identification profile 510 may optionally be used to automatically adjust the sensitivity setting 520 of curve warning logic 140. Driver identification profile 510 may cause the sensitivity setting 520 to change based on monitored or sensed conditions, such as bad weather, unfamiliar roads, darkness, and/or traffic density.

Figure 9:
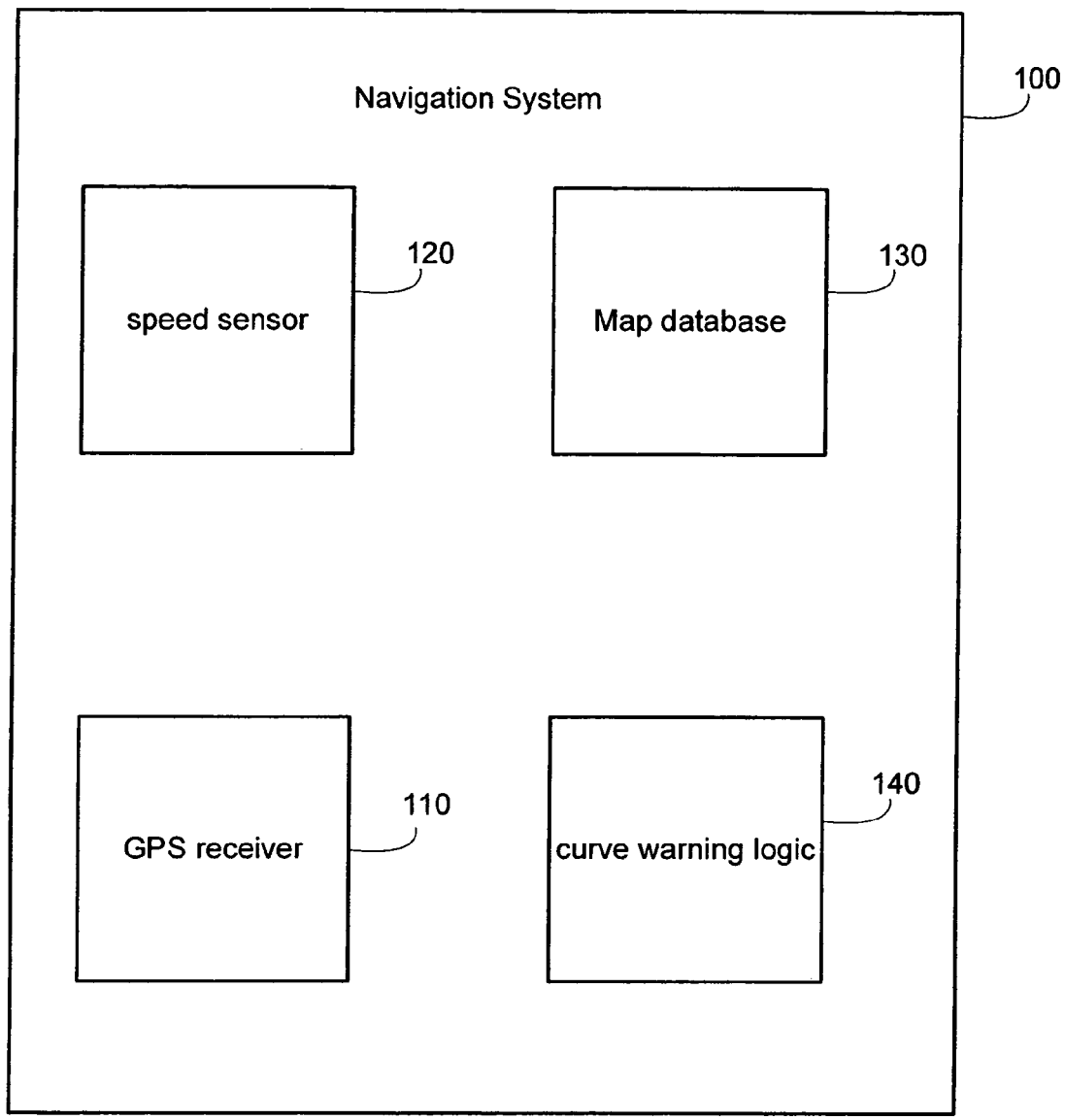
FIG. 9 is a second alternate system that issues curve warnings.

FIG. 9 is a second alternative block diagram of navigation system 100. In 15 FIG. 9, various devices are integrated or comprise a unitary part of the navigation system 100. Devices that may be integrated with navigation system 100 may include GPS receiver 110, speed sensor 120, map database 130, and/or curve warning logic 140. In some systems, all of some of these devices may be integrated with navigation system 100. In other systems, additional devices or software may be integrated with navigation system 100. These devices 20 may include sensors, such as paving and tread sensors, weather sensors, yaw rate sensors, and/or an inclinometer. Software that may be integrated or comprise a unitary part of the navigation system 100 may include automatic speed control and/or an electronic stability program. In other alternatives, the system may be integrated with or comprise a unitary part of other vehicle controllers (e.g., power train, entertainment, comfort, etc.).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A navigation system for a vehicle, comprising:
   a vehicle position sensor;
   a vehicle velocity sensor coupled to the vehicle position sensor;
   a curve warning device that determines a state parameter and generates a warning for the vehicle to traverse a roadway curvature along a path of the vehicle if the state parameter exceeds a predetermined limit, the warning based on a plurality of clothoid models and data received from the vehicle position sensor and the vehicle velocity sensor,
   where the state parameter comprises vehicle data, and
   the predetermined limit comprises a predetermined velocity or a predetermined centrifugal acceleration, and corresponds to a value for passage along the entire roadway curvature.

2. The system of claim 1, where the state parameter comprises at least one of a current vehicle velocity, an estimated future vehicle velocity, a current vehicle centrifugal acceleration, or an estimated future vehicle centrifugal acceleration.

3. The system of claim 2, where the warning comprises an output that notifies a driver.

4. A navigation system for a vehicle comprising:
means for determining a vehicle position;
means for determining a vehicle velocity;
a database comprising a plurality of clothoid models of a digital map; and
a curve warning means that determines a first state parameter and generates a warning for the vehicle to traverse a roadway curvature along a path of the vehicle if the state parameter exceeds a predetermined limit, the warning based on the plurality of clothoid models, the vehicle position, and the vehicle velocity,
where the first state parameter comprises vehicle data, and
where the first predetermined limit comprises a predetermined velocity or a predetermined centrifugal acceleration, and corresponds to a value for passage along the entire roadway curvature.

5. The system of claim 4, where the curve warning means determines a second state parameter and generates the warning if the first state parameter and the second state parameter exceed the first predetermined limit and a second predetermined limit, respectively, the warning based on the plurality of clothoid models of a digital map, the vehicle position, and the vehicle velocity, and
where the second state parameter comprises second vehicle data; and
where the second predetermined limit comprises a predetermined velocity or a predetermined centrifugal acceleration, and corresponds to a value for passage along the entire roadway curvature.

6. The system of claim 5, where the warning comprises an output that notifies a driver.

7. The system of claim 6, where
the first state parameter comprises at least one of the current vehicle velocity, an estimated future vehicle velocity, a current vehicle centrifugal acceleration, or an estimated future vehicle centrifugal acceleration; and
the second state parameter comprises at least one of the current vehicle velocity, an estimated future vehicle velocity, a current vehicle centrifugal acceleration, or an estimated future vehicle centrifugal acceleration.

8. The system of claim 7, further comprising a yaw rate sensor, where the first state parameter or the second state parameter is based on a turn about a vertical axis, respectively.

9. The system of claim 7, further comprising a means for determining the current vehicle centrifugal acceleration, where the first state parameter and the second state parameter are based on the current vehicle centrifugal acceleration.

10. The system of claim 7, further comprising an inclinometer, where the first state parameter and the second state parameter are based on balanced force components.

11. The system of claim 7, further comprising a paving sensor, where the first state parameter or the second state parameter is based on a frictional coefficient.

12. The system of claim 7, further comprising a tread sensor, where the first state parameter or the second state parameter is based on a road adherence estimation factor.

13. The system of claim 7, further comprising a hygrometer, where the first state parameter and the second state parameter are based on a humidity measurement.

14. The system of claim 7, further comprising an anemometer, where the first state parameter and the second state parameter are based on a wind speed measurement.

15. The system of claim 7, further comprising an electronic stability program, where the first state parameter and the second state parameter are based on a force required to return a vehicle to a previously disturbed condition of equilibrium.

16. The system of claim 7, further comprising means for determining a curve parameter of a curved path approached by a vehicle, based on the plurality of clothoid models.

17. The system of claim 16, where the curve parameter comprises the curvature of a curved path approached by a vehicle.

18. The system of claim 7, further comprising means for automatically adjusting the velocity of a vehicle if the first state parameter or the second state parameter exceed the first predetermined limit or the second predetermined limit, respectively.

19. The system of claim 7, where the curve warning means is configured to adapt to a driver's driving preferences.

20. The system of claim 7, where the curve warning means comprises an intelligent data processing device configured to adapt the curve warning means to a driver's driving preferences.

21. The system of claim 7, where the curve warning means is configured to provide the warning at different sensitivity levels.

22. A method that provides a warning about a curve through a navigation system of a vehicle, comprising:
determining a vehicle position;
determining a vehicle velocity;
determining a state parameter; and
generating a warning for a vehicle to traverse a roadway curvature along a path of the vehicle if the state parameter exceeds a predetermined limit, the warning based on a plurality of clothoid models of digital maps, a vehicle position, and a vehicle velocity,
where the state parameter comprises vehicle data, and
where the predetermined limit comprises a predetermined velocity or a predetermined centrifugal acceleration, and corresponds to a value for passage along the entire roadway curvature.

23. The method of claim 22, where the state parameter comprises at least one of the current vehicle velocity, an estimated future vehicle velocity, a current vehicle centrifugal acceleration, or an estimated future vehicle centrifugal acceleration.

24. The method of claim 23, further comprising determining at least one of a yaw rate, a centrifugal acceleration, a cross slope, a paving parameter, a tread parameter, or a weather parameter, and where the state parameter is based on at least one of the yaw rate, the centrifugal acceleration, the cross slope, the at least one paving parameter, the at least one tread parameter or the at least one weather parameter.

25. The method of claim 23, further comprising providing an electronic stability program configured to detect a force required to return a vehicle to a previously disturbed condition of equilibrium, and where the state parameter is based on the force required to return a vehicle to a previously disturbed condition of equilibrium.

26. The method of claim 23, further comprising determining a curve parameter of a curve approached by a vehicle, based on a plurality of clothoid models.

27. The method of claim 23, further comprising adjusting a vehicle velocity automatically, if the state parameter exceeds a predetermined limit.

28. The method of claim 23, where the act of generating a warning is adapted to a driver's individual driving preferences.

29. The method of claim 23, where the act of generating the warning further comprises generating the warning at different sensitivity levels.

30. A navigation system for a vehicle, comprising:

a vehicle position sensor;

a vehicle velocity sensor coupled to the vehicle position sensor;

a curve warning device that determines a state parameter and generates a warning for a vehicle to traverse a roadway curvature along a path of the vehicle if the state parameter exceeds a predetermined limit, the warning based on a plurality of clothoid models and data received from the vehicle position sensor and the vehicle velocity sensor, where the state parameter comprises an acceleration of a vehicle, a current velocity of a vehicle, an estimated future velocity of a vehicle, or a current centrifugal acceleration of a vehicle, and the predetermined limit comprises a velocity threshold or an acceleration threshold, and corresponds to a value for passage along the entire roadway curvature.

31. The system of claim 30, where the state parameter is based on a road condition.

32. The system of claim 31, where the road condition is affected by the weather.

\* \* \* \* \*